United States Patent Office 3,582,419
Patented June 1, 1971

3,582,419
VITREOUS OR VITROCRYSTALLINE LAMINATE PRODUCT
Jean Marchand, Alsemberg, Belgium, assignor to Glaverbel S.A., Watermael-Boitsfort, Belgium
No Drawing. Filed Apr. 22, 1968, Ser. No. 723,312
Claims priority, application Luxembourg, Aug. 30, 1967, 54,399; Great Britain, Jan. 16, 1968, 2,385/68
Int. Cl. B32b 17/06
U.S. Cl. 156—89
9 Claims

ABSTRACT OF THE DISCLOSURE

A method of forming a vitreous or vitrocrystalline product comprising laminating outer layers of vitreous or vitrocrystalline material with a molten or plastic layer of glass or vitrocrystalline material which has a coefficient of thermal expansion greater than that of said outer layers.

BACKGROUND OF THE INVENTION

This invention relates to vitreous and vitrocrystalline products.

It is well known that a sheet or other body formed of glass is much stronger under compressive loads than under tensile loads. The tensile strength can be improved by a thermal tempering process which has the effect of producing or increasing compressive stresses in the surface layers of the glass. Thermal tempering involves heating of the glass to a temperature close to its softening point and then rapidly chilling the glass in a current of air. In the course of this treatment there is a risk of the glass body becoming permanently deformed or of the glass becoming adversely affected.

SUMMARY OF THE INVENTION

It is a primary object of the present invention to avoid these drawbacks and difficulties.

Another object of the invention is to increase the mechanical strength of articles made of glass or vitrocrystalline material.

Yet another object of the invention is to increase the tensile strength of such articles.

Still another object of the invention is to simplify the production of articles having a high tensile strength.

These and other objects according to the invention are achieved by the provision of a method of forming a vitreous or vitrocrystalline product by contacting outer layers of a vitreous or vitrocrystalline material with an intervening layer of molten or softened glass or vitrocrystalline material having a coefficient of thermal expansion which is greater than that of either outer layer, and cooling the molten or softened material to a solid state for causing the intervening layer to unite with the outer layers of material and to place such outer layers under compression.

The objects of the invention are also achieved by the provision of a glass or vitrocrystalline product composed of at least two outer layers of vitreous or vitrocrystalline material, and an intervening layer of glass or vitrocrystalline material which has a higher coefficient of thermal expansion than the material of either outer layer and which unites the outer layers and maintains them in a state of compression.

DESCRIPTION OF THE PREFERRED EMBODIMENT

The present invention provides a process by which it is possible to form a vitreous or vitrocrystalline material of higher tensile strength than would normally be attainable by performing a tempering process.

According to the present invention, two bodies of vitreous or vitrocrystalline material are contacted with an intervening molten or softened, or plastic, layer of glass or vitrocrystalline material having a coefficient of thermal expansion greater than that of the material of either of said bodies and the molten or plastic layer of glass or vitrocrystalline material cools and solidifies, during which cooling and solidification the said intervening layer unites with the outer bodies of material, placing them under compression. The viscosity of the glass or of the glassy phase or phases of the inner layer is preferably lower than $10^8$ poises which is the viscosity of the softening point.

This process can be used for producing glass and vitrocrystalline laminates. The external bodies of material are preferably in solid state throughout the process. The external bodies can be in the form of flat or curved sheets of any dimensions and shape. For example, such bodies can be preshaped so that the laminate constitutes a shaped article, e.g., a vehicle windshield, a plate or dish, or a glazing or decorative panel. If the external bodies of material are raised in the process to a temperature such that they are deformable, the whole laminate can be shaped, e.g. by pressing between molds, prior to cooling.

In most applications of the invention presently envisaged the united surfaces of the outer bodies will have dimensions much greater than the thicknesses of said outer bodies and said outer bodies will hereinafter be referred to as "outer layers." In addition, the middle molten, or plastic glass or vitrocrystalline layer will be referred to as a "middle layer."

The magnitude of the compressive stresses set up in the outer layers depends inter alia on the magnitude of the coefficient of thermal expansion of the intervening middle molten or plastic layer, and on the difference between the temperature of the outer layers and the temperature of the intervening middle layer when this unites with said outer layers. To the extent that said outer layers are in a condition of expansion when the middle layer solidifies, this reduces the magnitude of the eventual compressive stresses. Therefore, it would be advantageous to have the outer layers to be as cold as possible at the critical stage so that high compressive stresses can be induced without having to raise the temperature of the plastic or molten glass or vitrocrystalline middle layer so high that said outer layers are exposed to injurious thermal shock.

Simultaneously with the production of compressive stresses in the outer layers, the middle layer is placed under tension but the tensile strength of the product as a whole is in general many times the tensile strength which would be possessed by said middle layer in the absence of the outer layers.

The composition of the middle layer is such that the middle layer melts or softens at a lower temperature than that which melts or softens the compositions of the outer layers. In general, the coefficient of expansion of glass is inversely proportional to the softening and melting temperatures of said glass. That is to say, the greater the coefficient of expansion is, the lower the softening and melting temperature of the glass will be. Therefore, there is a wide range of glasses fulfilling the required conditions from which the composition of the middle layer can be selected. The preferred range of coefficient of expansion for the middle layer is from $5 \times 10^{-6}/°C$. to $35 \times 10^{-6}/°C$. Thus, the range of suitable glasses includes colorless as well as colored glasses, glasses which are completely transparent and glasses which are hard enough not to be easily scratched, but the hardness is not really important because the glass is protected by the outer layers.

Subject to the condition that injurious thermal shocks must be avoided, it is an important advantage that the outer layers not be heated to a high temperature, thus avoiding all risk of deformation of the layers. It is not necessary that the outer layers have the same composition or thickness. However, if the stresses in the product are to be symmetrical, then the compressive stresses in the outer layers must balance. The compressive stresses in any given outer layer are influenced by its coefficient of thermal expansion and its thickness.

The invention can be carried out by coating a surface of one or each outer layer with a molten or plastic glass or vitrocrystalline material which is to form the middle layer, before the outer layers are held with the glass sandwiched between them. It is within the scope of the invention to apply molten or plastic glasses which have different compositions, and different coefficients of thermal expansion to the outer layers before they are assembled. This process is useful for achieving symmetrical stresses in the final product in the event that the outer layers differ in thickness or in some other way which but for some compensating factor would lead to an imbalance in the stress distribution. Each of the coefficients of thermal expansion of the two different glass compositions employed in the middle layers must of course be higher than the coefficients of thermal expansion of the outer layers.

In addition, glass for forming the middle layer can be applied as such to one or both outer layers. Alternatively, one or both outer layers may be initially coated with glass-forming components which can be formed into glass in situ either before or after being sandwiched between the outer layers.

Glass, glass-forming components, or vitrocrystalline materials can be applied in a molten condition to either one or both layers. For example, an outer layer may be partly immersed in or sprayed with molten glass, powdered glass, powdered glass-forming components, or vitrocrystalline materials. In the alternative, the middle layer materials could be supplied through an atomizer which melts the powder and sprays the melt.

Furthermore, glass or glass-forming components could be applied to one or both outer layers in discrete form and melted in situ, e.g. in a furnace, either before or after forming the sandwich. Certain glass-forming components can be applied in vacuo by evaporation or cathodic volatilization. Moreover, glass or a glass-forming mixture can be applied as a paste or in the form of particles suspended in a liquid, e.g. an organic liquid which can be applied to the outer layers. The thickness of the solid deposit can be controlled by controlling the degree of concentration of the suspension and the amount applied. The suspension can be applied by immersing the surface or surfaces to be coated in the suspension, by spraying, or by any other suitable method.

If it is desired to apply the middle layer components to only a portion of the outer layers, the glass or glass-forming components can be applied to a surface of one or both outer layers by spraying or by evaporation or volatilization technique, after the outer layer has been suitably masked.

Another way of carrying out the invention is to place a solid preformed glass layer between the outer layers. This preformed glass layer can then be melted or softened and the middle layer will be formed in situ. The middle layer is then allowed to solidify while pressure is applied to the assembly.

The composition of the middle layer and the cooling schedule to which it is subjected may be such that one or more crystalline phases are present in the middle layer in the final product. It is also possible to form the middle layer from a composition which includes a crystalline phase or phases when the material is applied between the outer layers. For example, when placing a solid preformed middle layer between the outer layers as discussed above, the preformed middle layer employed may be a layer of vitrocrystalline material and the composition and subsequent heating of said preformed glass between the outer layers may be such as to soften or melt the vitreous and the crystalline phase or phases or only the vitreous phase or phases, provided of course that the outer layers always remain solid.

According to a preferred feature of the invention an electrically conductive material is mixed with a composition for forming the middle layer of the laminate, and this layer is heated in situ by passing an electric current or electric currents along this layer. This may be done by means of suitable attached electrodes, an electromagnetic field, or coating the glass and its edges with a conductive material. In this way, the temperature of the middle layer can be raised sufficiently to melt it, while the outer layers are maintained at a low temperature so that one realizes the maximum advantage of the difference in the coefficients of thermal expansion of the outer and middle layers. Suitable electrically conductive substances for incorporating in the composition of the middle layer are titanium, aluminum, copper, tin, lead and silver.

The electrical heating can be controlled so as to heat the middle layer rapidly without any substantial heating of the outer layers. It is also possible to heat the middle layer slowly so as to allow the outer layers to become heated to some extent so as to eliminate the danger of thermal shock which could occur if the temperature gradient between the middle and outer layers is large. The electrical heating can be sufficient in itself to form or melt the middle layer, or supplementary exterior heating can be used if necessary.

It is desirable to avoid trapping gas between the outer layers in forming the laminate. With this objective in mind, it is helpful to assemble the layers by first bringing the outer layers together at an acute angle and then gradually reducing the angle between said layers to zero. It is preferred, however, whether or not the outer layers are manipulated in that way, to assemble the layers under subatmospheric pressure conditions. This step materially helps to avoid gaseous inclusions, if the pressure is sufficiently low. It is also recommended that the composition of the middle layer be melted under subatmospheric pressure, whether this melting is effected before or after assembling the outer layers, so as to ensure the elimination of any gaseous phase which may lead to the appearance of gas bubbles in the middle layer of the laminate.

The assembly of layers is preferably subjected to pressure immediately or at least before the composition of the middle layer has solidified. If the middle layer is not subjected, while in molten condition, to more than slight pressure such as may be imposed, e.g. by the weight of one of the outer layers, the molten substance assumes an equilibrium thickness which is inter alia a function of the surface tension of the substance. If the quantity of molten substance is small, the layer tends to become thicker and its spread contracts, leaving a space between the outer layers at the margins of the assembly. By exerting pressure on the assembly, this phenomenon can be avoided. This is very desirable because the edges and margins of an assembly are particularly susceptible to damage in handling, cutting, and during chemical and other treatments. In addition to this result, however, the exertion of pressure on the assembly so that the middle layer remains below its equilibrium thickness results in the middle layer having an increased tensile strength. For example, it has been found that glass which when left without pressure forms a layer with a tensile strength of approximately 8 kg./mm.$^2$, can form a layer with a tensile strength as high as 200–250 kg./mm.$^2$ if the glass is solidified under pressure.

The invention includes a glass or vitrocrystalline material comprising outer layers of vitreous or vitrocrystalline material which are united by an intervening layer of glass or vitrocrystalline material which has a higher coefficient of thermal expansion that the material of either of said outer layers and which holds said bodies in a state of compression.

The present invention will now be described by reference to the following specific examples. Such examples are presented for purposes of illustration only, and the present invention is in no way to be deemed as limited thereto.

EXAMPLE 1

Two sheets of glass were used having dimensions of 1 m. x 1 m. x 0.003 m. and the following composition by weight:

| | Percent |
|---|---|
| $SiO_2$ | 73 |
| CaO | 11 |
| MgO | 2 |
| $Na_2O$ | 12 |
| $K_2O$ | 2 |

The tensile strength of this glass was 9.2 kg./mm.$^2$ and the linear coefficient of expansion was $7.65 \times 10^{-6}$/° C. at 20° C.

A layer of pulverulent glass (grain size between 20 and its coefficient of expansion was $14.9 \times 10^{-6}$/° C. at one of the glass sheets. The composition by weight of this powdered glass was:

| | Percent |
|---|---|
| $SiO_2$ | 50 |
| $Na_2O$ | 45 |
| $B_2O_3$ | 5 | and its coefficient of expansion was $14.9 \times 10^{-6}$/° C. at 20° C. The coated glass sheet and the other glass sheet were heated to 510° C. over a period of 40 minutes. At 510° C. the sheets of glass were not deformed, but the glass powder had completely melted and spread over the supporting sheet to a thickness of 0.6 mm. The other glass sheet was then placed in position to sandwich the molten glass layer, and the assembly was cooled in 15 minutes.

Polarmetric edge analysis showed that after cooling the two sheets of glass were held under a uniform compressive stress of 4 kg./mm.$^2$ which considerably increased their mechanical strength. On the other hand, the middle layer of glass was held under a tensile stress of 25 kg./mm$^2$. Although the tensile strength of a glass of the kind composing this layer is normally only 6 kg./mm.$^2$, the intervening layer did not break.

EXAMPLE 2

A laminate was made by the same procedure and using the same materials as in Example 1, but after sandwiching the molten glass layer between the two sheets, a pressure of .05 kg./mm.$^2$ was exerted on the outer surfaces of the sheets causing the molten glass to flow and to form a layer of reduced thickness, viz. 0.4 mm. After cooling, the glass which had been squeezed out at the periphery of the assembly was removed by hammering and grinding. The tensile stress in the middle glass layer of the laminate was found to be 40 kg./mm.$^2$. The laminate was subsequently tested for strength and broke when the tensile stress in the middle layer reached 180 kg./mm.$^2$.

EXAMPLE 3

Another laminate was produced using the same materials and an identical method of Example 2 except that during the melting of the layer of powdered glass the ambient pressure was reduced to and kept at 0.01 atmosphere.

When the final product was tested for tensile strength, the tensile stress in the middle layer reached 195 kg./mm.$^2$ before the laminate broke.

EXAMPLE 4

A sheet of glass was used having the following composition by weight:

| | Percent |
|---|---|
| $SiO_2$ | 73 |
| CaO | 10 |
| $Na_2O$ | 16 |
| $As_2O_3$ | 0.2 |
| $Al_2O_3 + Fe_2O_3$ | 0.8 |

The coefficient of expansion of this glass was $10.8 \times 10^{-6}$/° C. at 20° C. One of the surfaces and the edges of this sheet were coated with a layer of metallic titanium whereafter a mixture comprising 80% by weight of an enamel of the following composition by weight was applied:

| | Percent |
|---|---|
| $BeF_2$ | 47 |
| Kf | 35 |
| $AlF_3$ | 17 |
| $SiO_2$ | 1 | and 20% of $SnO_2$ with a grain size less than 50 microns was deposited on the titanium. The coefficient of expansion of the enamel was $22 \times 10^{-6}$/° C. at 20° C.

The coated sheet of glass was then assembled with a ceramic sheet containing 60% by weight of glass of the same composition as the first sheet, and having a coefficient of expansion of $9.5 \times 10^{-6}$/° C. at 20° C.

A direct voltage of 130 volts was applied between two side edges of the first, titanium-coated sheet; in five minutes the temperature of the middle layer of the laminate reached 350° C. and one minute later, accelerated by the increased electrical conductivity of the $SnO_2$, the temperature reached 490° C. At that temperature the enamel was completely molten and had a viscosity of $10^3$ poises. However, the mean temperature of the glass and ceramic sheets did not exceed 60° C.

After cooling, the compressive stresses were found to be 30 and 27 kg./mm.$^2$ in the glass and ceramic sheets, respectively, while the layer, which was 0.8 mm. in thickness, was under a tensile stress of 120 kg./mm.$^2$.

EXAMPLE 5

Two sheets of glass identical with those used in Example 1 were used. A sheet of vitrocrystalline enamel 1 m. x 1 m. and approximately 4 mm. in thickness was formed from a composition comprising by weight:

| | Percent |
|---|---|
| $Li_2O$ | 20 |
| PbO | 30 |
| $ZrO_2$ | 4 |
| $SiO_2$ | 36 |
| ZnO | 10 | by completely melting this mixture and then rapidly cooling it, as a layer, to 300° C. in ten minutes. The resulting 4 mm. thick vitrocrystalline enamel sheet had a softening point of 500° C. and a coefficient of thermal expansion of $9 \times 10^{-6}$/° C. The vitrocrystalline sheet was then sandwiched between the two sheets of glass and the assembly was heated to a temperature of 530° C. at which temperature the two glass sheets remained quite rigid but the vitreous phase of the vitrocrystalline middle layer was soft and adhered strongly to the glass sheets. On cooling the assembly, the outer glass sheets were placed under compression because of the greater coefficient of expansion of the middle layer.

While various preferred embodiments of the present invention have been illustrated by way of specific examples, it is to be understood that the present invention is in no way to be deemed as limited thereto, but should be construed as broadly as all or any equivalents thereof.

What is claimed is:
1. A method of forming a vitreous or vitrocrystalline product comprising: contacting outer layers of vitreous or vitrocrystalline material with an intervening layer of molten or softened glass or vitrocrystalline material which has a coefficient of thermal expansion greater than that of either of said outer layers and which includes electrically conductive material, while passing electric currents along such layer for generating at least part of the heat necessary for bringing said intervening layer into a molten or softened condition; and cooling the molten or softened material to a solid state for causing the intervening layer to unite with the outer layers of material and to place such outer layers under compression.

2. A method as defined in claim 1 wherein the outer layers of material are in solid state at all times during the performance of the method.

3. A method as defined in claim 2 wherein said outer layers of material are initially in the form of sheets.

4. A method as defined in claim 2 wherein said step of contacting is carried out by initially causing the material of said intervening layer to form a coating on at least one of said outer layers, and then sandwiching said intervening layer between said outer layers.

5. A method as defined in claim 1 wherein said intervening layer is initially a layer of molten glass, and wherein during said cooling step a wholly vitreous intervening layer forms from said molten glass as it solidifies.

6. A method as defined in claim 1 wherein said step of contacting is carried out by providing an intervening layer which is substantially coextensive with the outer layers.

7. A method of forming a vitreous or vitrocrystalline product comprising: contacting outer layers of vitreous or vitrocrystalline material with an intervening layer of molten or softened glass or vitrocrystalline material which has a coefficient of thermal expansion greater than that of either of said outer layers; cooling the molten or softened material to a solid state for causing the intervening layer to unite with the outer layers of material and to place such outer layers under compression, and maintaining said layers under subatmospheric pressure as they are brought together and united.

8. A method of forming a vitreous or vitrocrystalline product comprising: contacting outer layers of vitreous or vitrocrystalline material with an intervening layer of glass or vitrocrystalline material which has a coefficient of thermal expansion greater than that of either of said outer layers while melting the intervening layer and maintaining it under subatmospheric pressure; and cooling the molten or softened material to a solid state for causing the intervening layer to unite with the outer layers of material and to place such outer layers under compression.

9. A method of forming a vitreous or vitrocrystalline product comprising: contacting outer layers of vitreous or vitrocrystalline material with an intervening layer of molten or softened glass or vitrocrystalline material which has a coefficient of thermal expansion greater than that of either of said outer layers; and cooling the molten or softened material to a solid state while subjecting said intervening layer, during its solidification, to a pressure applied between said outer layers, which pressure is sufficient to maintain said intervening layer below its equilibrium thickness, for causing the intervening layer to unite with the outer layers of material and to place such outer layers under compression.

References Cited
UNITED STATES PATENTS

| | | | |
|---|---|---|---|
| 1,838,781 | 12/1931 | Moulton et al. | 65—42X |
| 2,642,633 | 6/1953 | Dalton | 161—196X |
| 2,719,386 | 10/1955 | Johnson | 65—40X |
| 2,931,142 | 4/1960 | Veres | 161—193 |
| 2,959,894 | 11/1960 | Van Zonneveld | 65—40 |
| 3,074,838 | 1/1963 | Little | 156—104X |
| 3,405,019 | 10/1968 | Seil et al. | 156—104X |
| 3,410,674 | 11/1968 | Martin | 65—36X |
| 1,960,121 | 5/1934 | Moulton | 161—193X |

JOHN T. GOOLKASIAN, Primary Examiner

D. J. FRITSCH, Assistant Examiner

U.S. Cl. X.R.

156—99, 104, 106, 275; 161—193